United States Patent

Kudo et al.

[11] Patent Number: 5,831,799
[45] Date of Patent: Nov. 3, 1998

[54] MAGNETIC HEAD FOR USE WITH A FLOPPY DISK DEVICE

[75] Inventors: Noriaki Kudo; Hiroshi Sampei; Masashi Sato, all of Yamagata, Japan

[73] Assignee: Mitsumi Electric Co., Ltd., Tokyo, Japan

[21] Appl. No.: 902,066

[22] Filed: Jul. 29, 1997

[30] Foreign Application Priority Data

Jul. 30, 1996 [JP] Japan .................................. 8-216789

[51] Int. Cl.⁶ .......................... G11B 5/187; G11B 5/265
[52] U.S. Cl. ..................... 360/122; 360/103; 360/121
[58] Field of Search ................................ 360/103, 122, 360/125, 126, 121

[56] References Cited

U.S. PATENT DOCUMENTS 5,229,903  7/1993  Hayakawa et al. ................... 360/121
5,276,578  1/1994  Kato et al. ............................ 360/122

FOREIGN PATENT DOCUMENTS 6-12617  1/1994  Japan ................................... 360/125
6-36227  2/1994  Japan ................................... 360/125
6-68417  3/1994  Japan ................................... 360/125

*Primary Examiner*—Jefferson Evans
*Attorney, Agent, or Firm*—Whitham, Curtis & Whitham

[57] ABSTRACT

A magnetic head for use with a floppy disk device includes sliders (15, 16) formed in such a way that a magnetic head core (11) having a normal capacity is interposed between them and a magnetic head core having a large capacity (12) formed so as to be adjacent to one of the sliders. Grooves (15*b*, 15*c*, 20, 21) are respectively formed in the joints between the magnetic head core (11) having a standard capacity and the sliders (15, 16) and the joint between the magnetic head core having a large capacity (12) and the adjacent slider.

1 Claim, 2 Drawing Sheets

MAGNETIC HEAD FOR USE WITH A FLOPPY DISK DEVICE

BACKGROUND OF THE INVENTION

1. Field of the Invention

The present invention relates to a magnetic head for use with a floppy disk device which comprises a magnetic head core with a standard capacity and a magnetic head core with a large capacity.

12. Related art

FIGS. 3 and 4 are schematic representations for explaining existing magnetic heads for use with a floppy disk device. In the drawings, reference numeral 1 designates a magnetic head core with a standard capacity comprised of erasing gaps 1a, 1b and a recording gap 1c. Reference numeral 2 designates a magnetic head core with a large capacity which is comprised of a recording/playback gap 2a. 3, 3 designate coils attached to the magnetic head core 1, and reference numeral 4 designates a coil attached to the magnetic head core 2. Reference numeral 5 is a slider which is bonded at one end to the magnetic head core 1. The slider 5 is comprised of grooves 5a, 5b, and 5c and a cutout 5d for fixing the magnetic head core 2. Reference numeral 6 designates a slider which is bonded at one end to the magnetic head core 1. The magnetic head with a standard capacity is capable of recording or reproducing data on or from a floppy disk device with 1-megabyte or 2-megabyte capacity. In contrast, the magnetic head with a large capacity is capable of recording or reproducing data on or from a floppy disk device with a capacity of 100 MB or more.

These magnetic heads record or reproduce data on or from a magnetic recording medium.

Grooves 5b, 5c are formed on the respective sides of the large-capacity magnetic head core 2, whereas grooves are formed on neither of the sides of the magnetic head core 1 having a standard capacity. As a result, the amount of levitation of the magnetic head with reference to a magnetic recording medium becomes instable, and an adhesive used for bonding together the slider 5, the magnetic head core 1, and the slider 6 may come into contact with the magnetic recording medium during the operation.

In view of the forgoing problem, according to the present invention, a magnetic head for use with a floppy disk device which includes sliders formed in such a way that a magnetic head core having a normal capacity is interposed between them and a magnetic head core having a large capacity formed so as to be adjacent to one of the sliders, the improvement being characterized by comprising:

grooves which are respectively formed in the joints between the magnetic head core having a standard capacity and the sliders and the joint between the magnetic head core having a large capacity and the adjacent slider.

With this configuration, the grooves is formed on both sides of the large-capacity magnetic head core and on both sides of the normal-capacity magnetic head core. Therefore, the amount of levitation of the magnetic head with reference to a magnetic recording medium becomes stable and can be limited to a small value even when the magnetic head is rotated at a high speed. Moreover, the slider of the magnetic head core having a standard capacity, an adhesive used for bonding the standard-capacity magnetic head core to the slider, the slider of the magnetic head core having a large capacity, and an adhesive used for bonding the magnetic head core having the large capacity to the slider are prevented from coming into contact with the magnetic recording medium during the operation of the magnetic head.

DETAILED DESCRIPTION OF THE PREFERRED EMBODIMENTS

Figure 1:
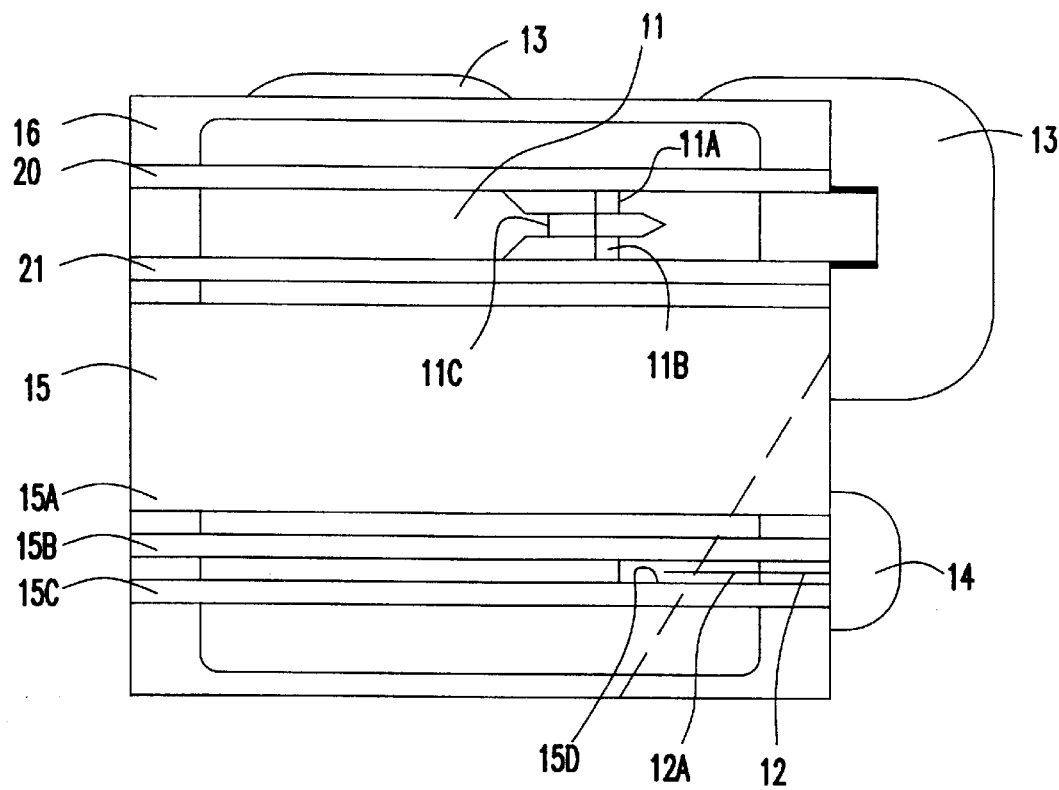
FIG. 1 is a plan view showing a magnetic head for use with a floppy disk device according to the present invention.
Figure 2:
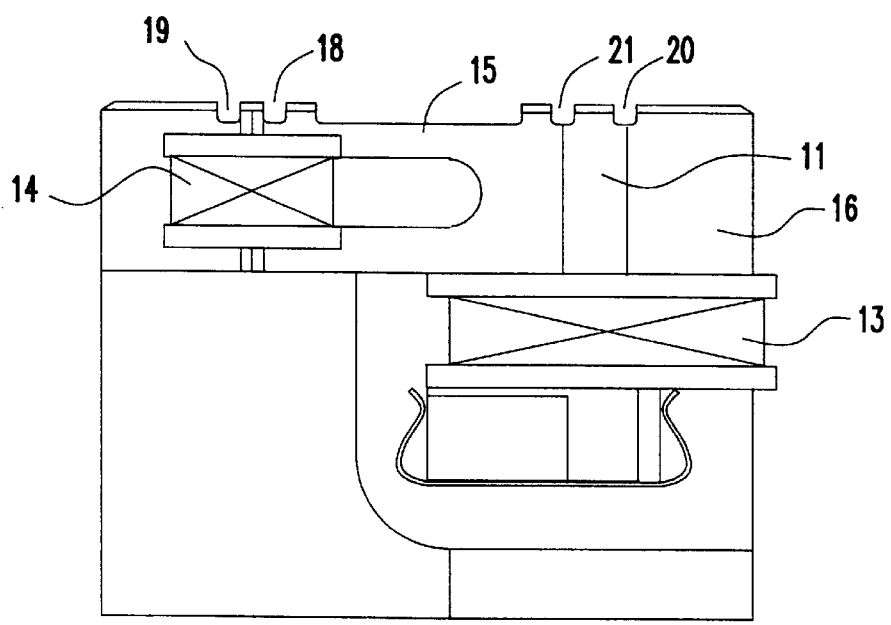
FIG. 2 is a side view showing the magnetic head of the present invention.
Figure 3:
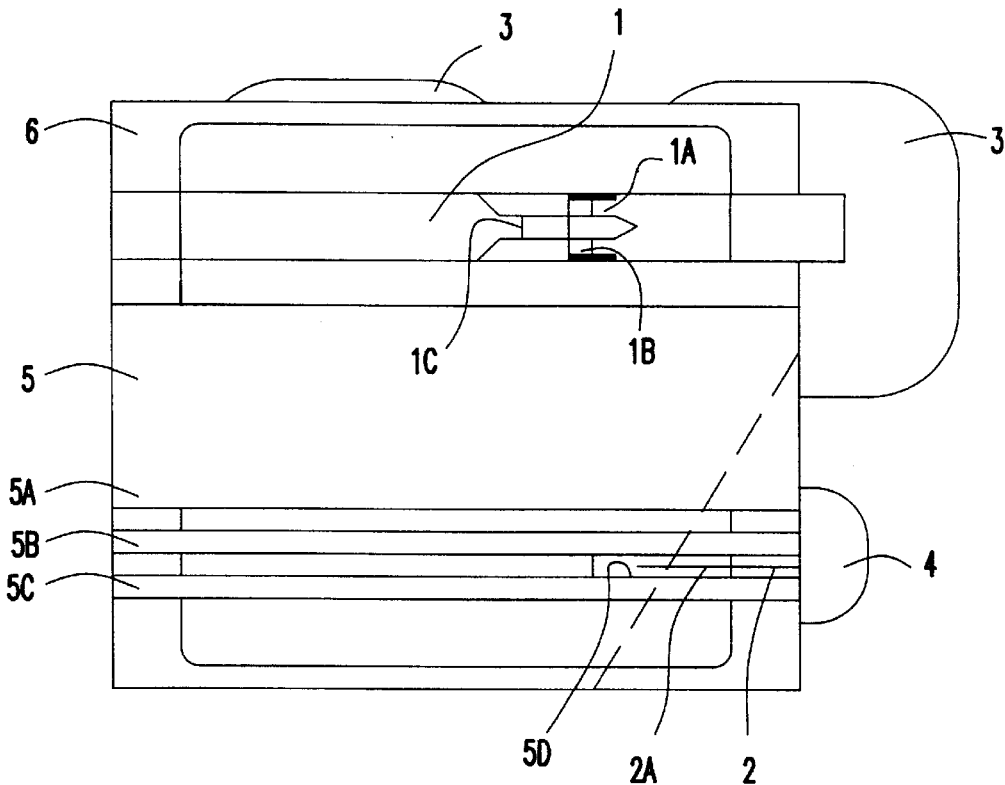
FIG. 3 is a plan view showing an existing magnetic head for use with a floppy disk device.
Figure 4:
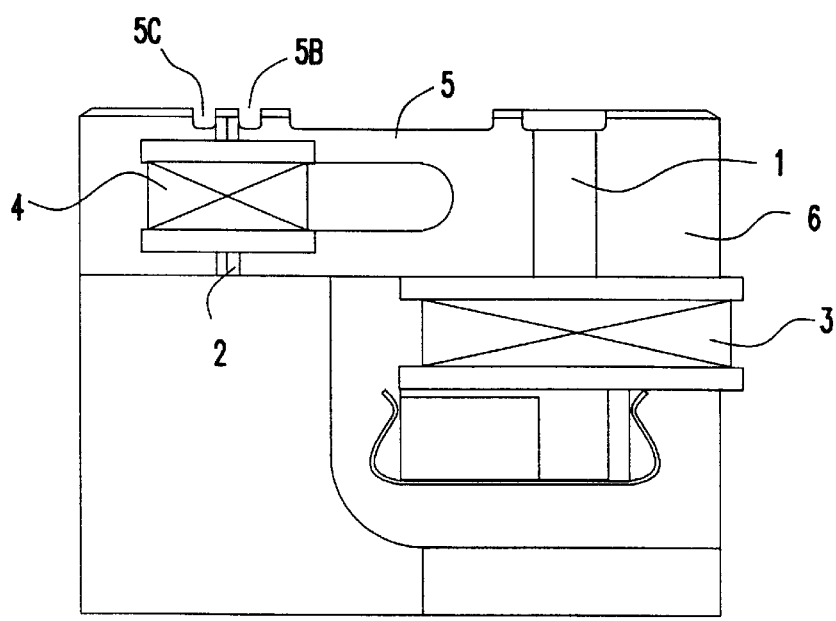
FIG. 4 is a side view showing the existing magnetic head.

With reference to FIGS. 1 and 2, a magnetic head for use with a floppy disk device according to the present invention will be described. In the drawings, reference numeral 11 designates a magnetic head core having a standard capacity which is comprised of erasing gaps 11a, 11b and a recording/playback gap 11c. Reference numeral 12 designates a magnetic head core having a large capacity which is comprised of a recording/playback gap 12a. Reference numeral 13, 13 are coils attached to the magnetic head core 11. Reference numeral 14 designates a coil attached to the magnetic head core 12, and reference numeral 15 designates a slider which is bonded at one end to the magnetic head core 11 and is comprised of a groove 15a and a cutout-shaped opening 15d for fixing the magnetic head core 12. Reference numeral 16 designates a slider which is bonded at one end to the magnetic head core 11. Reference numeral 15b designates a groove formed in the joint between the slider 15 and the magnetic head core 12, and reference numeral 15d designates a groove formed in the joint between the magnetic head core 12 and the slider 15. Reference numerals 21, 20 respectively designate a groove formed in the joint between the slider 15 and the magnetic head core 11 and a groove formed in the joint between the magnetic head core 11 and the slider 16. As shown in FIG. 2, the grooves 20, 21 are formed in the joint between the magnetic head core 11 and the slider 15 and the joint between the magnetic head core 11 and the slider 16.

The magnetic head with a standard capacity is capable of recording or reproducing data on or from a floppy disk device with 1-megabyte or 2-megabyte capacity. In contrast, the magnetic head having a large capacity is capable of recording or reproducing data on or from a floppy disk device with a capacity of 100 MB or more. These magnetic heads record or reproduce data on or from a magnetic recording medium.

In addition to the grooves formed on both sides of the magnetic head core having a large capacity, the grooves 20, 21 are also formed on both sides of the magnetic head core having a standard capacity. During the operation of the magnetic head having a standard capacity, a negative pressure acts on the magnetic recording medium, whereby the amount of levitation of the magnetic head becomes stable. Even when the speed of the rotation of the magnetic recording medium is increased, the amount of levitation is still maintained at a small value. The joint between the magnetic head core 11 and the slider 15 and the joint between the magnetic head core 11 and the slider 16 are spaced apart from the magnetic recording medium by virtue of the presence of the grooves 20, 21. During the operation, an adhesive used for bonding the slider and the core is prevented from coming into contact with the magnetic recording medium.

As has been described above, a magnetic head for use with a floppy disk device according to the present invention includes sliders formed in such a way that a magnetic head core having a normal capacity is interposed between them and a magnetic head core having a large capacity formed so as to be adjacent to one of the sliders, the magnetic head comprising grooves which are respectively formed in the joints between the magnetic head core having a standard capacity and the sliders and the joint between the magnetic head core having a large capacity and the adjacent slider. As a result, the amount of levitation of the magnetic head with reference to the magnetic recording medium becomes stable, and an adhesive used for bonding the slider to the magnetic head core is prevented from coming into contact with the magnetic recording medium.

What is claimed is:

1. A magnetic head for use with a floppy disk device comprising:

a magnetic head core with a standard capacity;

a magnetic head core with a large capacity relative to said standard capacity;

a first slider bonded between said magnetic head core with said standard capacity and said magnetic head core with said large capacity;

a second slider bonded on a side of said magnetic head core having said standard capacity facing away from said magnetic head core having said large capacity; and grooves formed in joints between said magnetic head core having said standard capacity and the adjacent slider and a joint between said magnetic head core having said large capacity and the adjacent slider.

* * * * *